Dec. 6, 1955 M. H. PETERSON 2,725,707
ROLLER SUPPORTING MEANS FOR DRAFT
TYPE FARM IMPLEMENT FRAME
Filed Dec. 22, 1951 2 Sheets-Sheet 1

INVENTOR.
MERLE H. PETERSON.
BY
Alden D. Redfield
ATTORNEY.

INVENTOR.
MERLE H. PETERSON.
BY Alden D. Redfield
ATTORNEY.

United States Patent Office 2,725,707
Patented Dec. 6, 1955

2,725,707

ROLLER SUPPORTING MEANS FOR DRAFT TYPE FARM IMPLEMENT FRAME

Merle H. Peterson, Coldwater, Ohio, assignor to Avco Manufacturing Corporation, Cincinnati, Ohio, a corporation of Delaware Application December 22, 1951, Serial No. 262,931

7 Claims. (Cl. 56—228)

This invention relates generally to farm implements and more specifically to a draft type of farm implement which is supported in part by the tractor hitch and in part by one or two caster wheels.

Many advantages are attributed to the use of caster wheels on implements of the draft type. Current practice, as a result, follows the prior art teaching in the use of one or two caster wheels to support the implement frame in conjunction with the support afforded by the towing device or tractor; however, inadequate thought has heretofore been given to a practical solution for the hitching and unhitching problems which are aggravated by caster action of the support wheel or wheels and by the loss of the tractor support after the implement is unhitched.

Therefore, it is an object of this invention to provide roller type ground engaging means suitably positioned and readily retractable for supporting a farm implement frame of the type normally supported in part by a tractor and in part by a caster wheel or caster wheels whereby the device can easily be brought into hitching position with little if any expenditure of manual lifting effort.

It is a further object of this invention to provide ground engaging roller means suitable for supporting a farm implement normally supported when unhitched by only one or two caster wheels whereby the farm implement can be readily moved about when separated from the tractor.

It is also an object of this invention to provide retractable roller type support means for a draft type farm implement which can be readily brought into ground engaging position for purposes of supporting said farm implement when separated therefrom.

It is a still further object of the present invention to provide non-castering roller type ground engaging means for a farm implement having only one or two normally supporting caster wheels, wherein said ground engaging means are connected to support the frame by a structure including an adjustable brace which allows the implement frame to be raised and lowered to facilitate connecting the implement to tractors of varying drawbar heights.

Briefly the invention comprises a farm implement supporting frame having one or two supporting caster wheels in combination with retractable ground engaging roller means for supporting said frame when the implement is separated from its prime mover. The added ground engaging rollers have rotational axes which lie parallel to the line of draft and are positioned on the frame so as to be laterally spaced sideways of the line of draft forming a triangular support configuration including the normal caster wheel support. One of the added roller means is connected to the frame near the tractor hitch end with a bracket and associated extensible brace, which in the preferred embodiment is a conventional lifting jack, suitable for raising or lowering the frame relative to the ground engaging roller and thus the hitch point. In those cases where only one caster wheel is provided on the implement supporting frame, a second retractable ground engaging roller means is provided. This second roller means is attached to the frame in position to form a triangular support configuration including the caster wheel and the other ground engaging roller means.

For a better understanding of the present invention, together with other and further objects, advantages and capabilities thereof, reference is made to the following disclosure and appended claims, in connection with the accompanying drawings, in which:

Figure 1:
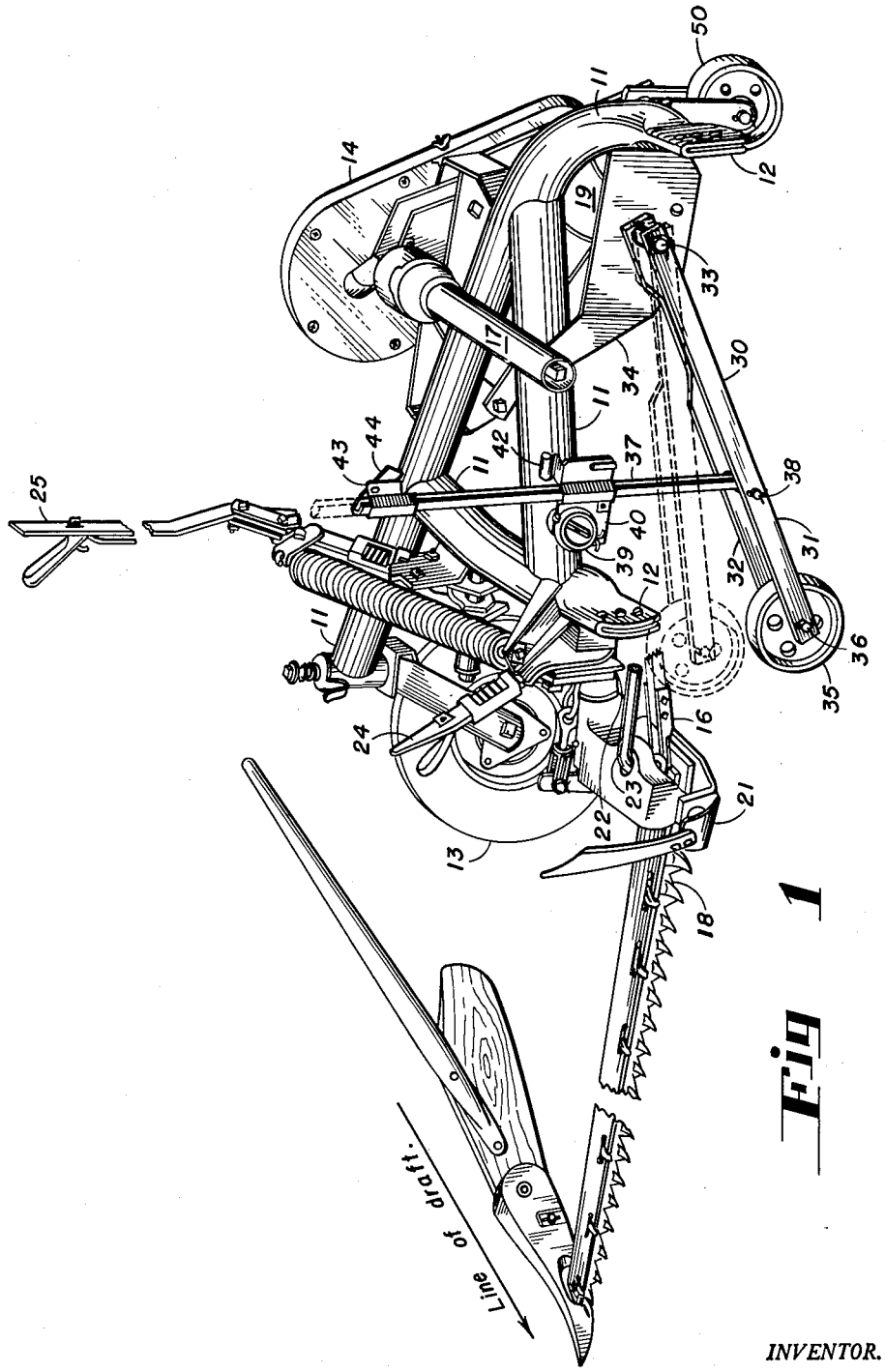
Fig. 1 shows an implement supporting frame having a single caster wheel and two fixed axis roller type ground engaging means.

As an aid to full appreciation and understanding of the structure involved there is shown, in Fig. 1, a mower supporting frame 11 of the tubular type having a plurality of openings 12 provided at the hitch end for connection to tractor drawbar assemblies of varying height. The rear end or trailing end of the mower frame 11 is supported by a single caster wheel 13. Though caster wheel 13 is shown to be positioned transverse to the line of draft, it will be apparent to those skilled in the art that it takes up a position along the line of draft when the frame is attached to a tractor and towed therebehind. Housing 14 covers the V-belt drive system 15, best shown in Figs. 2 and 3, which is powered through telescoping drive shaft 17. Cutter bar 18, only a part of which is shown, is driven by a conventional pitman rod 16, also shown only in part, from flywheel 19. Cutter shoe 21 is supported from frame 11 by push bar 22 and pull rod 23, parts of which have been deleted from Fig. 1 in order to clearly show the novel structure specifically involved. Lever 24 along with the conventionally associated parts shown connected thereto provides means for tilting the cutter head 21 and the cutter bar 18; while lever 25 along with the associated link assembly shown provides means for raising and lowering cutter head 21 and cutter bar 18 in conventional manner.

The structure thus far described is considered conventional at least as far as the invention yet to be described is concerned and it is not deemed necessary to exhaustively describe what is well-known to those skilled in the art. For example, push bar 22 normally extends beneath mower frame 11, being swingably secured to the frame at a point beneath the telescoping drive shaft 17. Likewise, pull rod 23 and pitman rod 16 as well as cutter bar 18 are shown in foreshortened form so as not to confuse the showing of the hitch end ground engaging roller means. Actually, the novel combination hereinafter described will function with any other equivalent implement supporting frame using one or two caster wheels to support the trailing portion of the structure and the supported implement is not at all to be considered restricted to mowers, per se. Any other draft type farm implement and suitable mounting frame supported by one or two caster wheels may be used in place of the structure thus far described, as will become apparent. Thus, it is not deemed necessary, in order to clearly disclose the novel structure, to exhaustively describe a conventional implement and mounting frame used as a part of the novel combination.

The novel concept here involved generically comprises the idea of using retractable laterally spaced roller type ground engaging means to support a draft type of implement after it is detached from the towing tractor and parked. The preferred embodiment, Fig. 1, shows a retractable roller assembly having primary utility at the hitch end of the implement frame.

The bracket foot 30 comprises members 31 and 32 which are rotatably secured to a stub shaft 33, which has a longitudinal axis parallel to the line of draft. Stub shaft 33, in turn, is integrally connected to plate member 34 which is a part of frame 11. As can be seen in Fig. 1, ground engaging roller 35 rotates about an axle 36 having a longitudinal axis also extending parallel to the line of draft.

Brace or rack member 37 is pivotally secured to the bracket foot members 31 and 32 by shaft 38. Tubular stub 39, which is integrally attached to frame 11 so as to have a longitudinal axis parallel to the line of draft, rotatably supports brace clamp assembly 40. In the preferred embodiment, brace clamp member 40 comprises a conventional lift jack, having a lifting handle socket 42 and associated mechanism which operates in conjunction with brace or rack member 37.

Where the lift jack does not include a two-way pawl stop, i. e., a releasable pawl which can also be used to hold brace member 37 in raised position, an additional pawl assembly 43 must be used. Thus when it is desired to secure the roller foot assembly in raised position, after the implement frame has been attached to a tractor, pawl assembly 43 is moved downwardly along brace member 37 until it strikes lift jack assembly 40 and spring loaded click pawl lever 44 engages the rack teeth formed on brace member 37.

Conversely, when roller 35 is in ground engaging position and it is desired to use lift jack 40 for either lifting or lowering frame 11, the click pawl lever 44 must be depressed against its loading spring and disengaged from the rack teeth of brace member 37 so to allow the pawl assembly to be slid upwardly out of the way into a position adjacent the top end of brace member 37.

It should be understood that the novel generic concept herein disclosed is not restricted to the idea of using the specific type of lift jack and holding pawl assembly shown in Fig. 1 and described above. Other structures such as a lift jack working on a rotating screw principle or one using a hydraulic system may be used.

The ground engaging roller type assembly just described is all that is necessary for implement frame structures using two caster wheels, since it adds the third point of ground engaging support making it possible to hitch and unhitch the frame from the towing tractor without requiring excessive manual lifting effort. Also, since the added ground engaging device provides a non-castering type of roller, the resulting three-point support is reasonably stable and free from undesired movement when the tractor is brought into hitching position. In other words, the added roller foot keeps the implement from moving backwards along the line of draft during the hitching operation, an advantage which would not be realized if the roller foot also used a freely moving caster wheel.

Figure 2:
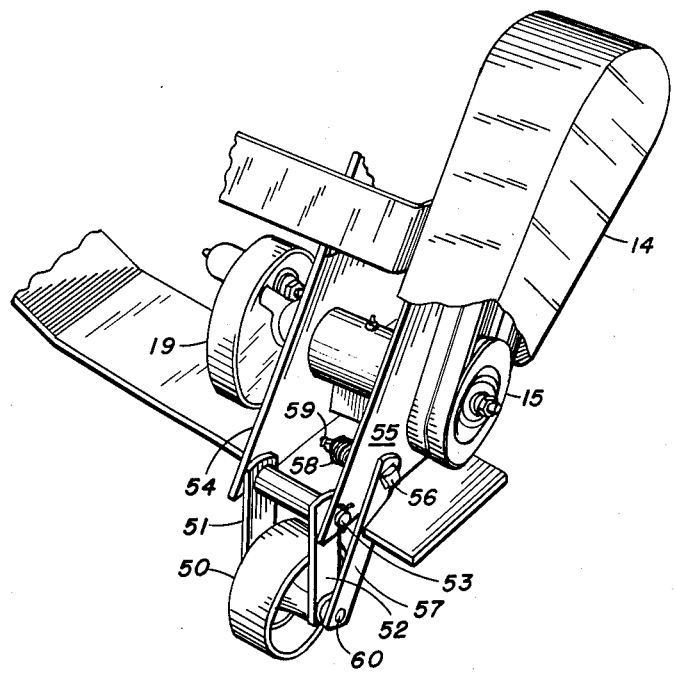
Fig. 2 shows the fixed axis roller type ground engaging means in extended position supporting the rear portion of the frame.
Figure 3:
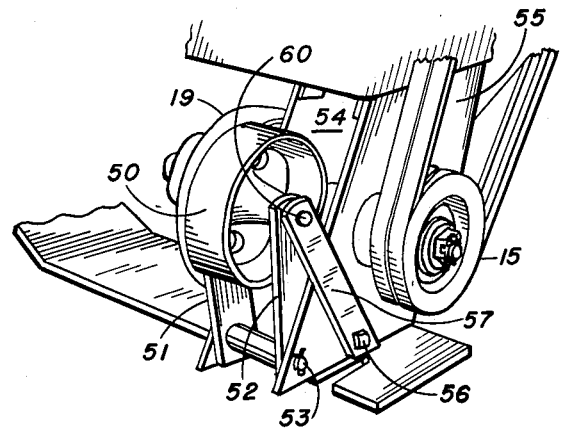
Fig. 3 shows the rear retractable roller type ground engaging means in retracted position.

For implement supporting frames using only one caster wheel, similar to the preferred embodiment shown in Fig. 1, a second retractable ground engaging roller is required. As best shown in Figs. 2 and 3 this second roller does not require a lift jack type of brace, but must be attached to the frame in a retractable position which will allow the second roller to complete a three-point support configuration including the hitch roller foot and the rear frame caster wheel. In the specific structure disclosed it was found desirable to place this second roller foot beneath the portion of the frame which holds the pulley drive system and flywheel pitman rod assembly. The second roller foot assembly comprises a roller 50 rotatably supported by bracket members 51 and 52 on a rotational axis lying parallel to the line of draft. Bracket members 51 and 52 are swingably supported for rotation around shaft 53 which in turn is supported generally by frame 11 and specifically by bearings formed in the flywheel shield assembly plates 54 and 55. Brace member 57 is rotatably secured to plate 55 by machine bolt 56, acting in conjunction with spring 58 which is compressed between the forward side of plate 55 and a hexagonal nut 59. Thus it is apparent that brace member 57 not only rotates around the longitudinal axis of machine bolt 56 and in a plane perpendicular to the line of draft but also may be made to rotate in a plane slightly out of a perpendicular so that the other end of the brace which is formed with an opening may be slipped over an extension of axle 60. As a result the bracket assembly may be either braced into a non-rotating position wherein the roller is in ground engaging position as shown in Fig. 2 or the bracket assembly may be braced and held in a retracted non-rotating position as shown in Fig. 3. In other words if the roller is in ground engaging position and it is desired to place it in its retracted position, brace 57 is slipped off of and rearwardly of the end of shaft extension 60, placing spring 58 in compression. Then the roller is lifted into the position shown in Fig. 3 and the brace opening again slipped over shaft extension 60. After the brace opening is slipped over shaft extension 60 in either the retracted position shown in Fig. 3 or the ground engaging position shown in Fig. 2, the brace will be held in the position by action of compression spring 58, and the bracket assembly kept from rotating about axis 53.

The advantages which are derived from the novel structure should now be apparent, making it unnecessary to include herein a lengthy dissertation on its merits. However, to briefly consider the primary advantages, it is to be noted that once the retractable ground engaging rollers are placed in ground engaging position the implement frame cannot be rolled either forward or backward along the line of draft. As a result, a tractor can be backed up until it butts against the hitch end of the implement frame without causing the frame to be moved along the line of draft.

Also, the extensible brace used in connection with the hitch end ground engaging roller may be used to position the hitch end of the frame relative to the tractor drawbar making it unnecessary to manually lift the hitch end of the frame during hitching operation. Conversely, when it is desired to unhitch the frame, it is possible to remove the weight of the implement frame from the tractor drawbar by means of the lift jack brace used in conjunction with the forward ground engaging roller means.

Additionally, the use of these retractable ground engaging rollers makes it possible to move the implement frame around after it is detached from the tractor, thus facilitating parking and storage.

While there has been shown and described what is at present considered the preferred embodiment of the present invention, it will be obvious to those skilled in the art that various changes and modifications may be made therein without departing from the scope of the appended claims.

Having thus described my invention, I claim:

1. In a trailing implement attachment for tractors the combination comprising an implement supporting frame adapted to be connected to a tractor, a single caster wheel mounted to support the rear portion of said frame, a first retractable ground engaging roller means mounted on the tractor end of said frame, a second retractable ground engaging roller means mounted on said frame laterally of said first roller means so as to form a triangular support configuration with said caster wheel and said first ground engaging roller means, each of said ground engaging roller means being rotatable about a fixed axis which is substantially parallel to the towing axis of said frame, whereby the caster wheel and the two roller means provide three point frame support when said roller means are in ground engaging position.

2. In a trailing implement attachment for tractors the combination comprising an implement supporting frame adapted to be connected to a tractor, a rear frame supporting caster wheels, two ground engaging laterally spaced rollers each mounted on said frame with retractable brackets in spaced relationship with each other and said caster wheel, the rotational axes of said rollers being fixed parallel to the line of draft.

3. The structure defined in claim 2 wherein both retractable brackets comprise rigid foot members rotatably mounted on said frame for rotation about an axis parallel to the line of draft, and a releasable associated brace member for holding each foot member at a fixed angle relative to the ground plane.

4. The structure in claim 3 wherein one of said brace members comprises a link having one end rotatably secured to said frame by shaft means having a longitudinal axis which is spaced from and distortably held in parallel with the rotational axis of the associated foot member, said link being formed at the other end for releasable connection to the axis of the bracket mounted ground engaging roller.

5. In a trailing type implement for attachment to a tractor, the combination comprising a ground-engaging castered roller at the rear end of the implement, means engageable with the tractor located at the other end of the implement, the tractor and said castered roller supporting the implement during use, means for supporting said implement when the tractor is detached from the tractor-engaging means, said second means comprising two laterally spaced retractable ground-engaging rollers, each having a fixed axis of rotation substantially parallel to the line of draft, said retractable rollers being in spaced relation to each other and to the castered roller.

6. In a tractor-trailing implement, the combination comprising a ground-engaging support at the rear of said implement, a tractor-engaging means at the other implement end, means for supporting said implement when detached from the tractor, said last-named means comprising two laterally spaced retractable ground-engaging rollers having fixed axes of rotation substantially parallel to the line of draft whereby said implement is restrained from movement parallel to the line of draft.

7. In a trailing type implement for attachment to a tractor, the combination comprising a ground engaging caster wheel at the rear of the implement, tractor engaging means at the front of the implement, said caster wheel and said tractor engaging means supporting the implement during use, means supporting the implement when not engaged with the tractor and for holding the implement relatively stationary during engagement of the tractor with said tractor engaging means, said last named means comprising a pair of vertically retractable rollers movably connected to the implement, each of said rollers being laterally spaced from said caster wheel and rotatable about an axis which is parallel to the line of draft of the implement, said rollers being spaced rearwardly of said tractor engaging means, both of said rollers being retractable after engagement of the tractor with the tractor engaging means.

References Cited in the file of this patent

UNITED STATES PATENTS

| Number | Name | Date |
|---|---|---|
| 256,484 | Jones | Apr. 18, 1882 |
| 1,212,396 | Pfeiffer et al. | Jan. 16, 1917 |
| 1,941,821 | Baker | Jan. 2, 1934 |
| 2,027,127 | Tastenhoye | Jan. 7, 1936 |
| 2,057,655 | Anthony et al. | Oct. 20, 1936 |
| 2,113,448 | Hewitt | Apr. 5, 1938 |